(12) United States Patent
Choi et al.

(10) Patent No.: US 11,895,359 B2
(45) Date of Patent: Feb. 6, 2024

(54) ELECTRONIC DEVICE AND OPERATING METHOD THEREOF

(71) Applicant: Samsung Electronics Co., Ltd., Suwon-si (KR)

(72) Inventors: Hyeongsu Choi, Suwon-si (KR); Seongin Kang, Hwaseong-si (KR); Teck Sheng Ng, Hwaseong-si (KR); Bongchan Cho, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/587,321

(22) Filed: Jan. 28, 2022

(65) Prior Publication Data

US 2022/0329465 A1    Oct. 13, 2022

(30) Foreign Application Priority Data

Apr. 13, 2021   (KR) .................. 10-2021-0048030
Jul. 28, 2021   (KR) .................. 10-2021-0099441

(51) Int. Cl.
| | | |
|---|---|---|
| *H04N 21/4363* | (2011.01) | |
| *H04N 21/63* | (2011.01) | |
| *H04N 21/442* | (2011.01) | |
| *G06F 11/30* | (2006.01) | |

(52) U.S. Cl.
CPC ... *H04N 21/43635* (2013.01); *G06F 11/3041* (2013.01); *H04N 21/631* (2013.01); *H04N 21/44227* (2013.01)

(58) Field of Classification Search
CPC ........... H04N 21/43635; H04N 21/631; H04N 21/44227; H04N 21/4518; H04N 21/64738; H04N 5/765; G06F 11/3041; G06F 13/16; H04L 25/03878; H04L 25/0272

See application file for complete search history.

(56) References Cited

U.S. PATENT DOCUMENTS

| | | |
|---|---|---|
| 7,729,874 B2 | 6/2010 | Keady et al. |
| 7,809,085 B2 | 10/2010 | Rea et al. |
| 8,964,861 B2 | 2/2015 | Boccaccio et al. |
| 9,008,164 B2 | 4/2015 | Hong et al. |

(Continued)

FOREIGN PATENT DOCUMENTS

| | | |
|---|---|---|
| KR | 2015-0018157 A | 2/2015 |
| KR | 101637494 B1 | 7/2016 |

(Continued)

*Primary Examiner* — Michael Lee
(74) *Attorney, Agent, or Firm* — Harness, Dickey & Pierce, P.L.C.

(57) ABSTRACT

An electronic device and an operating method thereof are provided. The electronic device includes a receiver, a memory, a processor configured to search the memory for fixed rate link (FRL) transmission bandwidth data for a source device in response to an electrical connection to the source device, perform FRL link training with a bandwidth value of the FRL transmission bandwidth data determined according to a FRL transmission bandwidth data search result, and process a content signal transmitted with a transmission bandwidth when the FRL link training is completed, and a reproducing device configured to perform a reproducing operation based on the processed content signal.

18 Claims, 14 Drawing Sheets

(56) References Cited

U.S. PATENT DOCUMENTS

| | | |
|---|---|---|
| 9,942,605 B2 | 4/2018 | Lee et al. |
| 10,880,626 B2 | 12/2020 | Suzuki |
| 10,924,305 B2 | 2/2021 | Kumar et al. |
| 2013/0057760 A1 | 3/2013 | Lee |
| 2017/0359513 A1* | 12/2017 | Anantharaman ...... H04N 23/45 |
| 2020/0365112 A1* | 11/2020 | Oh ................... H04N 21/43635 |
| 2021/0021904 A1* | 1/2021 | Kim ................ H04N 21/42204 |
| 2021/0185389 A1* | 6/2021 | Shin ................ H04N 21/44227 |
| 2021/0409642 A1* | 12/2021 | Chan ...................... H04N 7/015 |
| 2022/0109908 A1* | 4/2022 | Chan ............... H04N 21/43635 |
| 2022/0150445 A1* | 5/2022 | Campbell ........ H04N 21/44227 |
| 2022/0150555 A1* | 5/2022 | Chan ............... H04N 21/43635 |

FOREIGN PATENT DOCUMENTS

| | | |
|---|---|---|
| KR | 10-2016-0132900 A | 11/2016 |
| KR | 2020-0029854 A | 3/2020 |

* cited by examiner

FIG. 3

| SOURCE ID | FRL RATE | FFE RATE | CTLE PHY |
|---|---|---|---|
| A | 48Gbps | FFE 0 | PHY 1 |
| B | 40Gbps | FFE 3 | - |
| C | 9Gbps | FFE 1 | PHY 3 |
| D | 24Gbps | NULL | PHY 4 |
| E | NULL(TMDS) | NULL | PHY 2 |

FIG. 11A

| Monitoring | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Attenuation | a | a | a | a | a | a | a | a | a | a | a | a | a | a |
| Gain | g | g | g | g | g | g | g | g | g | g | g | g | g | g |
| Boost | b1 | b2 (b1<b2) | b3 (b2>b3) | b4 (b3>b4) | b5 (b4>b5) | b6 (b5>b6) | b7 (b6<b7) | b8 (b7<b8) | b9 (b8>b9) | b10 (b9>b10) | b11 (b10>b11) | b12 (b11<b12) | b13 (b12<b13) | b14 (b13>b14) |
| Error count | e1 (th≤e1) | e2 (th≤e1<e2) | e3 (th≤e3≤e2) | e4 (th≤e4≤e3) | e5 (th≤e5≤e4) | e6 (th≤e5<e6) | e7 (th≤e7≤e6) | e8 (th≤e7<e8) | e9 (th≤e9≤e8) | e10 (th≤e10≤e9) | e11 (th≤e10<e11) | e12 (th≤e12≤e11) | e13 (th≤e12<e13) | e14 (th≥e14) |

FIG. 11B

| Monitoring | 1 | 2 | 3 | 4 | 5 | 6 | 7 | 8 | 9 |
|---|---|---|---|---|---|---|---|---|---|
| Attenuation | a | a | a | a | a | a | a | a | a |
| Gain | g1 | g2 (g1<g2) | g3 (g2>g3) | g4 (g3>g4) | g5 (g4>g5) | g6 (g5>g6) | g7 (g6<g7) | g8 (g7<g8) | g9 (g8>g9) |
| Boost | b | b | b | b | b | b | b | b | b |
| Error count | e1 (th<e1) | e2 (th<e1<e2) | e3 (th<e3≤e2) | e4 (th<e3<e4) | e5 (th<e4<e5) | e6 (th<e5<e6) | e7 (th<e7≤e6) | e8 (th<e7<e8) | e9 (th≥e9) |

ELECTRONIC DEVICE AND OPERATING METHOD THEREOF

CROSS-REFERENCE TO RELATED APPLICATIONS

This application is based on and claims priority under 35 U.S.C. § 119 to Korean Patent Application Nos. 10-2021-0048030, filed on Apr. 13, 2021 and 10-2021-0099441, filed on Jul. 28, 2021, in the Korean Intellectual Property Office, the disclosures of which are incorporated by reference herein in their entirety.

BACKGROUND

The inventive concepts relate to an electronic device, and more particularly, to an electronic device and an operating method thereof.

As content of ultra high definition (HD) resolution beyond Full HD resolution has increased, sink devices and source devices having a high definition multimedia interface (HDMI) port supporting HDMI 2.1 have become prevalent. In HDMI 2.1, a fixed rate link (FRL) output format may be used.

SUMMARY

The inventive concepts provide an electronic device for storing transmission characteristic data improved or optimized for each source device, and an operating method thereof.

According to an aspect of the inventive concepts, there is provided an electronic device including a receiver configured to receive a signal transmitted from a source device, a memory configured to store first data, a processor configured to search the memory for fixed rate link (FRL) transmission bandwidth data for the source device in response to an electrical connection to the source device, perform FRL link training with a bandwidth value of the FRL transmission bandwidth data determined according to a FRL transmission bandwidth data search result, and process a content signal transmitted with a transmission bandwidth when the FRL link training is completed, and a reproducing device configured to perform a reproducing operation based on the content signal processed by the processor.

According to another aspect of the inventive concepts, there is provided an electronic device including a signal input/output module configured to communicate with a source device, a memory configured to store first data, a processor configured to search the memory for fixed rate link (FRL) transmission bandwidth data for the source device in response to an electrical connection to the source device, transmit FRL transmission bandwidth data determined according to a FRL transmission bandwidth data search result to the source device through the signal input/output module when FRL link training starts, and process a content signal received through the signal input/output module, and a reproducing device configured to perform a reproducing operation based on the content signal processed by the processor.

According to another aspect of the inventive concepts, there is provided an operating method of an electronic device including a connection operation of toggling a hot plug detect signal, a search operation of searching a memory for fixed rate link (FRL) transmission bandwidth data corresponding to a source device, an FRL link training operation of transmitting transmission characteristic data determined according to a FRL transmission bandwidth data search result to the source device, when FRL link training starts, a setting operation of setting a characteristic value of a sink equalizer equalizing a signal received from the source device, after the FRL link training is completed, and a reproducing operation performing operation of performing a reproducing operation based on a content signal transmitted from the source device.

BRIEF DESCRIPTION OF THE DRAWINGS

Embodiments of the inventive concepts will be more clearly understood from the following detailed description taken in conjunction with the accompanying drawings in which:

FIG. 3 is a diagram illustrating fixed rate link (FRL) transmission bandwidth data, source equalizer characteristic data, and sink equalizer characteristic data corresponding to each source device according to an embodiment of the inventive concepts;

FIGS. 11A and 11B are diagrams illustrating an embodiment of changing a characteristic value of a sink equalizer.

DETAILED DESCRIPTION OF THE EMBODIMENTS

Figure 1:
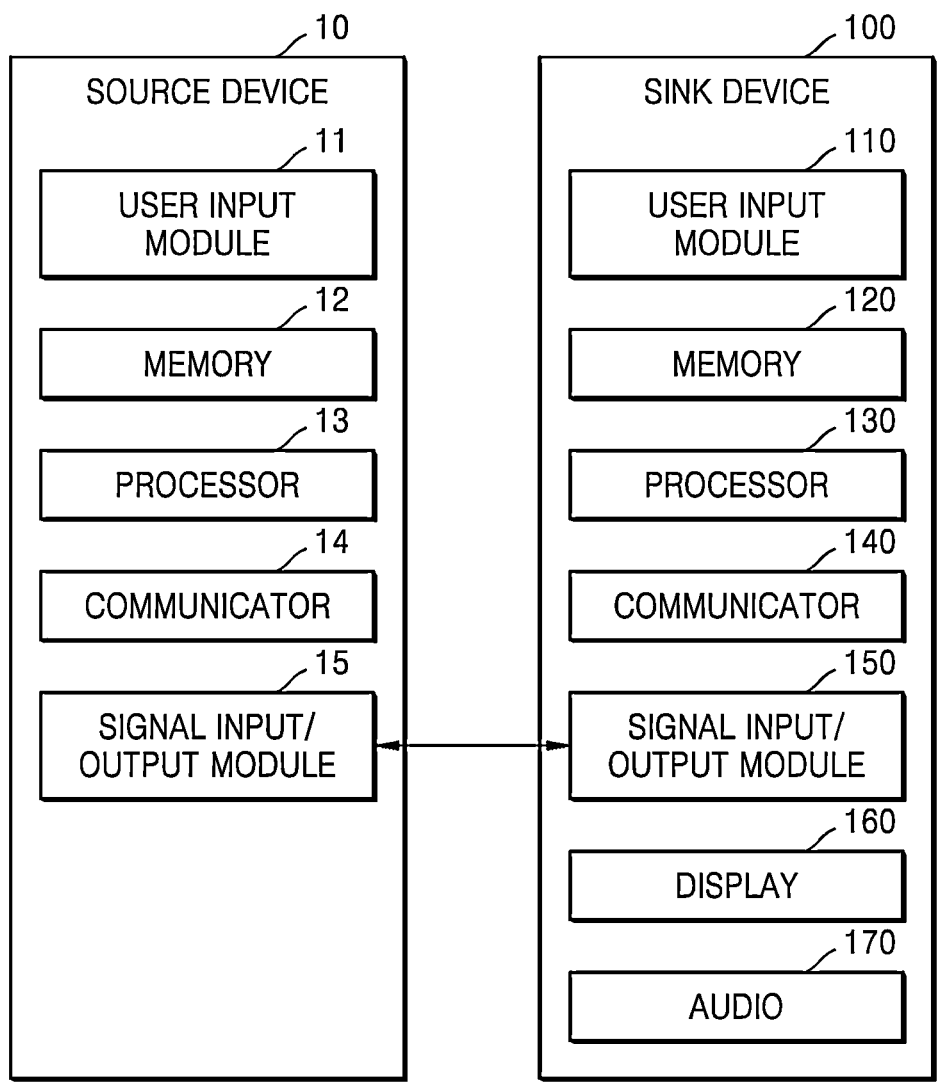
FIG. 1 is a diagram illustrating a source device and a sink device according to an embodiment of the inventive concepts.

Hereinafter, embodiments of the inventive concepts will be described in detail with reference to the accompanying drawings. The embodiments of the inventive concepts are provided to more completely explain the inventive concepts to those of ordinary skill in the art. The inventive concepts may have various changes and may have various forms, and thus, specific embodiments will be illustrated in the drawings and described in detail. However, this is not intended to limit the inventive concepts to a specific form of disclosure, and it should be understood to include all modifications, equivalents and substitutes included in the spirit and scope of the inventive concepts. In describing each figure, like reference numerals are used for like components. In the accompanying drawings, the dimensions of the structures are enlarged or reduced than the actual size for clarity of the inventive concepts.

FIG. 1 is a diagram illustrating a source device 10 and a sink device 100 according to an embodiment of the inventive concepts.

Referring to FIG. 1, the source device 10 may be an electronic device generating a content signal by itself or receiving a content signal. The source device 10 may be implemented in various types, such as, for example, an optical media playback device such as a DVD or a Blu-ray disc, a UHD player, a set-top box, a TV, a computer body, a mobile device, a home theater, a game device, a content server, and the like. The content signal may include a video signal or an audio signal. Alternatively, the content signal may include a video signal and an audio signal.

In an embodiment, the source device 10 may include a user input module 11, a memory 12, a processor 13, a communicator 14, and a signal input/output module 15.

The user input module 11 may be a module provided to be operated by a user. The user input module 11 may include various types of input interface-related circuits. For example, the user input module 11 may be implemented in various forms, such as a mechanical or electronic button of the source device 10, a remote controller separated from a main body of the source device 10, a touchpad, and a touch screen.

The memory 12 may read stored data and output the read data under the control of the processor 13. Also, the memory 12 may store data (e.g., first data) under the control of the processor 13. The memory 12 may be implemented as a non-volatile memory that stores data and instruction regardless of supply of power or a volatile memory that operates only when power is supplied. The non-volatile memory may be flash memory and read only memory (ROM), and the flash memory may include, for example, NAND flash memory, NOR flash memory, or the like. The volatile memory may include, for example, DRAM, SRAM, or the like. The processor 13 may operate by executing instructions stored on the memory 12. The processor 13 may be configured to execute operations by executing instructions stored on the memory 12.

The processor 13 may output a content signal in an output format corresponding to extended display identification data (EDID) of the sink device 100. The EDID may indicate device characteristic information of an electronic device, device information, supportable resolution, image format, transmission interface standard, and maximum fixed rate link (FRL) transmission bandwidth supported by the sink device 100.

The communicator 14 may be a bidirectional communication circuit including at least one of components such as a communication module and a communication chip corresponding to various types of wired and wireless communication protocols. The communicator 14 may be implemented in various forms, for example, a Wi-Fi communication chip that performs Wi-Fi communication through an access point, a Bluetooth low energy (BLE) communication chip that performs BLE communication, and a LAN card connected to a router or gateway.

The signal input/output module 15 may serve as a communication interface. For example, the signal input/output module 15 may transmit a content signal processed by the processor 130 to the sink device 100. In an embodiment, the signal input/output module 15 may include a transmitter and a receiver. In this embodiment, the signal input/output module 15 may transmit/receive a signal based on a high definition multimedia interface (HDMI) transmission standard. The HDMI transmission standard has been released up to version 2.1. HDMI 2.1 may be defined to transmit a content signal having a higher resolution than that of a previous version, for example, a content signal representing an 8K-class resolution. If a display 160 included in the sink device 100 is to display an 8K-class image, the source device 10 as well as the display 160 has to support HDMI 2.1. HDMI 2.1 is described below with reference to FIG. 2.

The sink device 100 may be an electronic device that processes and reproduces a content signal transmitted from the source device 10. Here, the term "reproducing" may refer to displaying an image according to processed video data, outputting audio according to processed audio data, or displaying an image and audio according to processed video data and audio data. The sink device 100 may be implemented in various forms, such as a TV, a monitor, a portable multimedia player, a mobile phone, a tablet, an electronic picture frame, an electronic blackboard, and an electronic billboard.

In an embodiment, the sink device 100 includes a user input module 110, a memory 120, a processor 130, a communicator 140, a signal input/output module 150, the display 160, and an audio device 170.

The user input module 110 may perform the same operation as that described above, may include a receiver and a transmitter, and may be implemented as a remote controller, a touchpad, a touch screen, etc. separated from a main body of the sink device 100.

The memory 120 may perform the same operation as described above. In an embodiment, the memory 120 may store transmission characteristic data corresponding to each of a plurality of source devices. The transmission characteristic data may be data representing, when each source device is connected to the sink device 100, a transmission standard of a content signal to be provided by each source device to the sink device 100, a transmission bandwidth, a characteristic value for equalizing the content signal to be transmitted, etc. In another embodiment, the memory 120 may further store equalizer characteristic data corresponding to each source device. The equalizer characteristic data may be data representing a characteristic value of an equalizer that equalizes a received content signal. Such an equalizer may be included in the sink device 100.

When the source device 10 is electrically connected to the sink device 100, the processor 130 may determine whether the source device 10, which is currently connected, has been previously connected. Here, that the source device 10 being electrically connected to the sink device 100 may refer to that a port provided in the source device 10 is connected to a port provided in the sink device 100 through a cable. As used herein, "electrically connected" may refer to "accessed". Whether the source device 10, which is currently connected, has been previously connected may be identified, for example, by determining by the processor 130 whether the transmission characteristic data for the currently connected source device 10 is stored in the memory 120.

In an embodiment, in response to the electrical connection to the source device 10, the processor 130 may search (determine) whether FRL transmission bandwidth data for the source device 10 is stored in the memory 120.

The processor 130 may perform FRL link training. FRL link training may be a communication connection process for communication between the source device 10 and the sink device 100. Details of the FRL link training are described below with reference to FIG. 6.

In an embodiment, the processor 130 may perform FRL link training with a bandwidth value of the FRL transmission bandwidth data determined according to a result of searching the memory 120. For example, when FRL transmission bandwidth data for the currently connected source device 10 is stored in the memory 120, the processor 130 may start FRL link training with a bandwidth value indicated by the stored FRL transmission bandwidth data. As another example, when the currently connected source device 10 is initially connected to the sink device 100, the FRL transmission bandwidth data for the currently connected source device 10 may not be in the memory 120. In this case, the processor 130 may start FRL link training with a bandwidth value of maximum FRL transmission bandwidth data supported by the sink device 100.

In another embodiment, when FRL link training starts, the processor 130 may transmit FRL transmission bandwidth data determined according to a FRL transmission bandwidth data search result to the source device 10 through the signal input/output module 150. The source device 10 may receive the FRL transmission bandwidth data and transmit a pattern signal, as a bandwidth value of the FRL transmission bandwidth data, to the sink device 100.

When the FRL link training is completed, the source device 10 may transmit the content signal to the sink device 100 with a transmission bandwidth at the time of completion of the FRL link training. The processor 130 may process the content signal received through the signal input/output module 150. The processor 130 may process the content signal transmitted with the transmission bandwidth at the time of completion of the FRL link training.

The communicator 140 and the signal input/output module 150 are similar to or the same as the communicator 14 and the signal input/output module 15 described above, and thus, a description thereof is omitted.

The display 160 may display an image based on video data of the content signal processed by the processor 130.

The audio device 170 may output audio based on audio data of the content signal processed by the processor 130.

In an embodiment, a device including at least one of the display 160 and the audio device 170 may be referred to as a playback device. The playback device may perform a reproducing operation based on the content signal processed by the processor 130.

Figure 2:
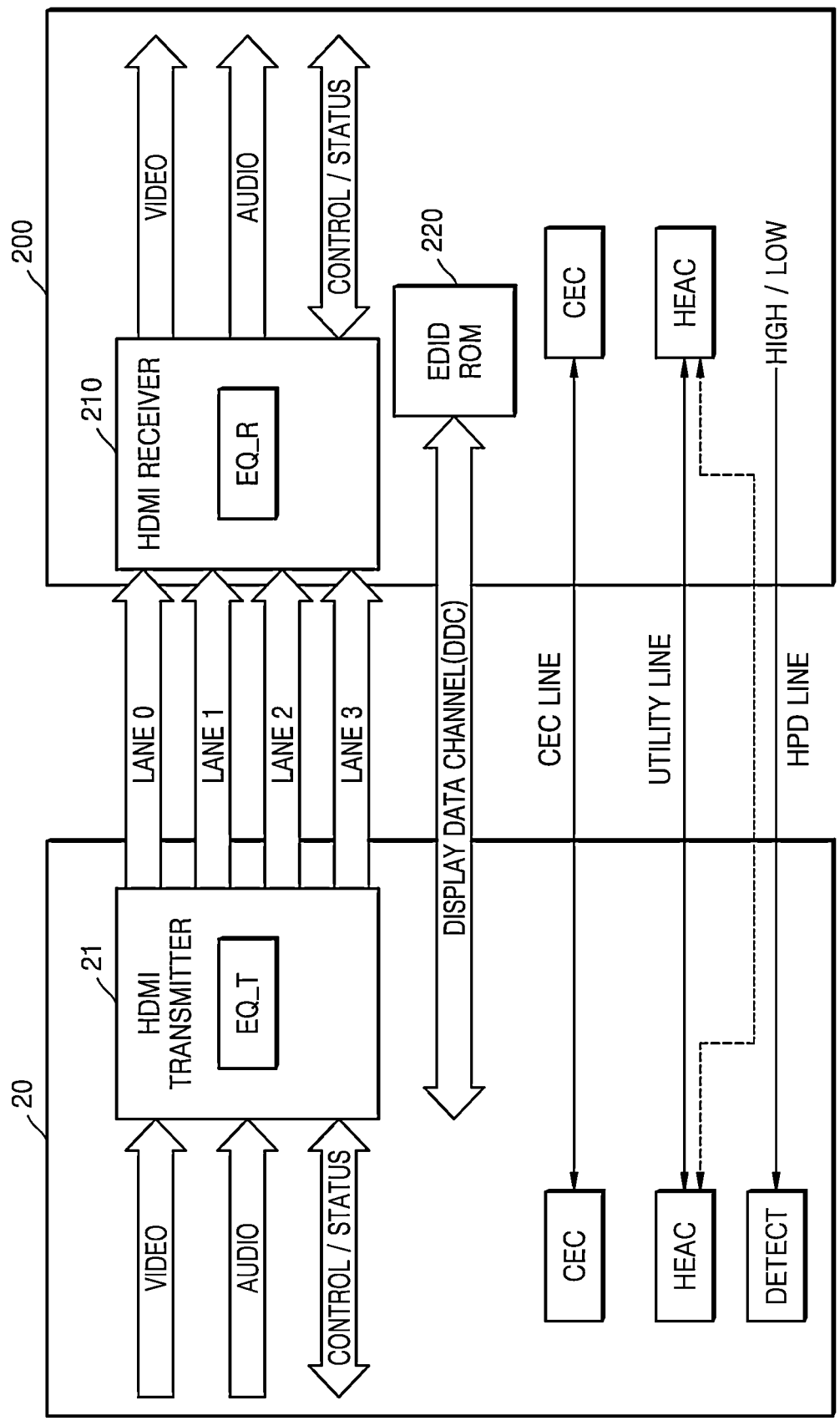
FIG. 2 is a diagram illustrating a high definition multimedia interface (HDMI) transmission standard according to an embodiment of the inventive concepts.

FIG. 2 is a diagram illustrating an HDMI transmission standard according to an embodiment of the inventive concepts.

Referring to FIG. 2, the HDMI transmission standard according to an embodiment of the inventive concepts may be HDMI 2.1 or higher. In HDMI 2.1 or higher, both a transition minimized differential signaling (TMDS) transmission method and an FRL transmission method may be supported.

HDMI 2.1 has a basic structure similar to its predecessor, but has some differences. HDMI 2.1 may provide 48 Gbps, which is more than 2.5 times higher than HDMI 2.0 having a transmission bandwidth of 18 Gbps. In an embodiment, HDMI 2.1 supports 48 Gbps (12 Gbps per lane, 4 lanes driven), 40 Gbps (10 Gbps per lane, 4 lanes driven), 32 Gbps (8 Gbps per lane, 4 lanes driven), 24 Gbps (6 Gbps per lane, 4 lanes driven), 18 Gbps (6 Gbps per lane, 3 lanes driven), and 9 Gbps (3 Gbps per lane, 3 lanes driven), totaling 6 transmission bandwidths. HDMI 2.1 may transmit even 10-bit color encoded HDR content of 4 K at 144 Hz and support uncompressed transmission of 8K at 30 Hz. The previous version of HDMI 2.1 transmits a content signal through three lanes, whereas HDMI 2.1 transmits a content signal through four lanes. Therefore, a data transfer rate according to HDMI 2.1 is much higher than the previous version of HDMI 2.1.

In HDMI, TMDS may be used for a physical layer, high-bandwidth digital content protection (HDCP) may be used for content security, extended display identification data (EDID) may be used for device-to-device authentication, and consumer electronics control (CEC) may be used for a control system access of an overall system.

HDMI cables and connectors include four differential pairs constituting four lanes (LANE 0, LANE 1, LANE 2, and LANE 3) for transmitting data. These lanes may be used to transmit video data, audio data, and auxiliary data or may be used to transmit a pattern signal to the sink device 100 during FRL link training. A "lane" herein may be referred to as a channel. In an embodiment, HDMI 2.1 may transmit content data through four lanes (LANE 0, LANE 1, LANE 2, and LANE 3) and does not have a clock channel for transmitting a separate clock signal. In HDMI 2.1, the clock signal is not transmitted separately from data but is embedded in the data. In contrast, the previous version of 2.1 uses 3 lanes (LANE 0, LANE 1, LANE 2) out of 4 lanes (LANE 0, LANE 1, LANE 2, LANE 3) as data channels, and one lane (e.g., LANE 3) is used as the clock channel. That is, the third lane LANE 3 used as a data channel in HDMI 2.1 is used as a clock channel in the previous version of 2.1.

HDMI may include a display data channel (DDC), which is an I2C-based communication channel. The DDC may be used to exchange environment and state information between a source device 20 and a sink device 200. The DDC may be used by the source device 20 to determine the performance and characteristics of the sink device 200. The source device 20 may acquire the EDID recorded in EDID ROM 220 of the sink device 200 through the DDC and determine a performance level of the sink device 200 according to the obtained EDID. In FRL link training, the sink device 200 transmits response data for the pattern signal through the DDC, and the source device 20 may identify an FRL bandwidth value, information indicating a TMDS transmission method, a training result value indicating a pass or an error, information indicating to turn on or turn off an operation of an equalizer included in the source device 20, a characteristic value of the equalizer included in the source device 20, etc., included in the response data.

The CEC may be used to provide high-level control functions between all the various AV products in the system. The CEC may connect all the source devices 20 and the sink devices 200 in the system to a single control line. While the DDC is formed between the source device 20 and the sink device 200 in a one-to-one manner, the CEC connects all devices in the system, and thus, the CEC may be used in the case of controlling all the devices by a single remote controller, for example. A port connection signal may be transmitted to the sink device 200 through a CEC line. The port connection signal may be a signal indicating that the connection between the source device 20 and the sink device 200 is maintained without being disconnected. An ID signal for identifying the source device 20 may be transmitted to the sink device 200 through a CEC line.

An HDMI Ethernet and audio return channel (HEAC) may be used to provide Ethernet-compatible data networking in the opposite direction to TMDS between access devices and an audio return channel.

The sink device 200 may transmit a hot plug detect (HPD) signal to the source device 20 through an HPD line to inform the source device 20 that the source device 20 is electrically connected to the sink device 200. In an embodiment, when the source device 20 is electrically connected to the sink device 200, the sink device 200 may change a signal level of the HPD signal from LOW to HIGH.

In an embodiment, the source device 20 may include a transmitter 21 (i.e., an HDMI transmitter 21), and the transmitter 21 may include a source equalizer EQ_T. The source equalizer EQ_T may equalize various signals to be transmitted to the sink device 200. The source equalizer EQ_T may have a characteristic value corresponding to the sink device 200 through FRL link training. The source equalizer EQ_T may be implemented as a feed forward equalizer (FFE), but is not limited thereto. Hereinafter, it is assumed that the source equalizer EQ_T is an FFE. A characteristic value of the FFE may represent a combination of coefficients representing a filter characteristic (or a transfer function characteristic). For example, the characteristic value of the FFE may range from FFE 0 (or 0) to FFE 3 (or 3), but is not limited thereto. When the characteristic value of FFE is 0, pre-shoot and de-emphasis are the smallest, and when the characteristic value of FFE is 3, pre-shoot and de-emphasis are the largest. However, the inventive concepts are not limited thereto.

In an embodiment, the sink device 200 may include a receiver 210 (i.e., an HDMI receiver 210), and the receiver 210 may include a sink equalizer EQ_R. The sink equalizer EQ_R may equalize various signals transmitted from the source device 20 based on a characteristic value of the equalizer characteristic data. The sink equalizer EQ_R may be implemented as a continuous time linear equalizer (CTLE), but is not limited thereto. Hereinafter, it is assumed that the sink equalizer EQ_R is the CTLE. A characteristic value of the CTLE may include a value indicating a filter characteristic (or a transfer function characteristic), for example, a pole value indicating a characteristic of an alternating current (AC), a boost value, a DC gain value, a peaking gain value, and an attenuation value, and the like. The sink equalizer EQ_R may have a preset default value as a characteristic value. Alternatively, the sink equalizer EQ_R may have a characteristic value improved or optimized for the currently connected source device 20. A characteristic value improved or optimized for the currently connected source device 20 may be stored in the memory 120.

FIG. 3 is a diagram illustrating FRL transmission bandwidth data, source equalizer characteristic data, and sink equalizer characteristic data corresponding to each source device according to an embodiment of the inventive concepts.

Referring to FIG. 3, the memory 120 included in the sink device 100 according to an embodiment of the inventive concepts may store transmission characteristic data corresponding to each of the source devices. To this end, the memory 120 may store ID information for identifying each of (or at least one of) the source devices.

In an embodiment, the transmission characteristic data may include FRL transmission bandwidth data FRL RATE. Also, the transmission characteristic data may further include source equalizer characteristic data FRL RATE. The source equalizer characteristic data FFE RATE may be data representing a characteristic value of the source equalizer (e.g., EQ_T of FIG. 2).

Referring to FIG. 3, for example, in the case of a source device having a source ID of "A", the memory 120 may store FRL transmission bandwidth data having a bandwidth value of 48 Gbps and source equalizer characteristic data FFE RATE having an FFE characteristic value of FFE 0 (or 0). This may mean that the source device having a source ID "A" has been connected to the sink device 100 and the transmission bandwidth and FFE characteristic when the FRL link training is passed are 48 Gbps and FFE 0, respectively.

As another example with reference to FIG. 3, in the case of a source device having a source ID "D", the memory 120 may store FRL transmission bandwidth data having a bandwidth value of 24 Gbps and source equalizer characteristic data FFE RATE having an FFE characteristic value of NULL. This may mean that a source device having the source ID "D" has been connected to the sink device 100, a transmission bandwidth when the FRL link training is passed is 24 Gbps, and the FFE is turned off.

As another example with reference to FIG. 3, in the case of a source device having a source ID "E", the memory 120 may store FRL transmission bandwidth data and source equalizer characteristic data FFE RATE, both of which are NULL. This may mean that the source device having the source ID "E" has been connected to the sink device 100, but FRL link training has failed and that the source device having the source ID "E" may be able to transmit a content signal to the sink device 100 according to the TMDS transmission method.

In an embodiment, the memory 120 may further store sink equalizer characteristic data CTLE PHY corresponding to each source device. The sink equalizer characteristic data CTLE PHY may be data representing a characteristic value of the sink equalizer (e.g., EQ_R of FIG. 2).

Referring to FIG. 3, for example, in the case of the source device having the source ID of "A", the memory 120 may store the sink equalizer characteristic data CTLE PHY having a first characteristic value PHY 1. That is, it may mean that, when the source device having the source ID "A" is connected to the sink device 100, an optimal characteristic value of CTLE is the first characteristic value PHY 1.

As another example with reference to FIG. 3, in the case of a source device having a source ID "B", a sink equalizer characteristic data CTLE PHY having a characteristic value improved or optimized for the source device having the source ID "B" may not have been stored yet in the memory 120.

The transmission characteristic data, the source equalizer characteristic data FFE RATE, and the sink equalizer characteristic data CTLE PHY stored in the memory 120 may be data improved or optimized when each source device is connected to the sink device 100. The improved or optimized data may be data when FRL link training is passed, but is not limited thereto, and may be data when FRL link training finally fails.

Figure 4:
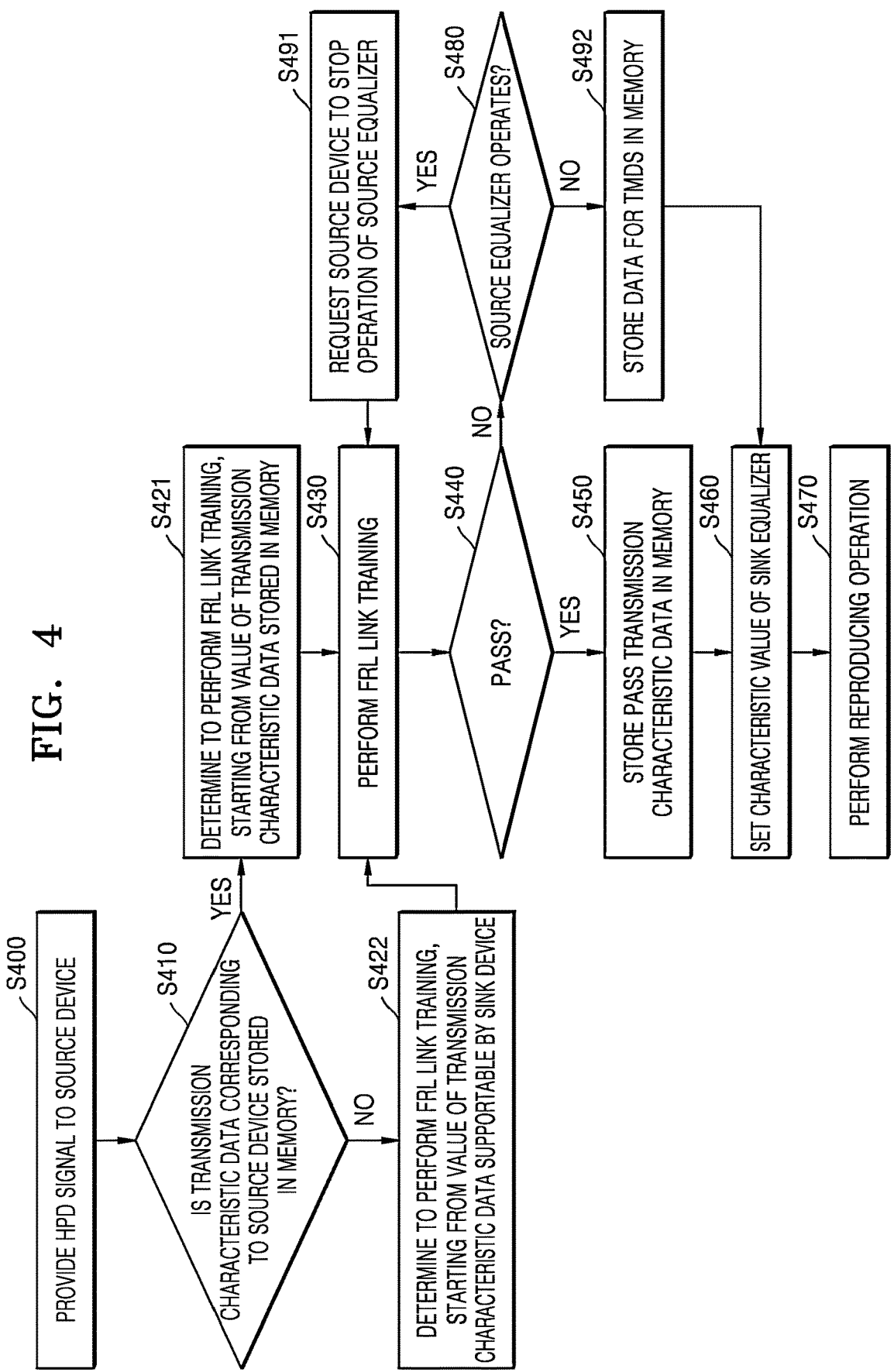
FIG. 4 is a flowchart illustrating a method of operating a sink device according to an embodiment of the inventive concepts.

FIG. 4 is a flowchart illustrating a method of operating a sink device according to an embodiment of the inventive concepts.

Referring to FIG. 4, operation S400 is a connection operation. In operation S400, the sink device 100 toggles an HPD signal. In an embodiment, the processor 130 changes a signal level of the HPD signal from LOW to HIGH.

Operation S410 is a search operation. In operation S410, the sink device 100 searches whether transmission characteristic data corresponding to the source device is stored. In an embodiment, the processor 130 searches whether FRL transmission bandwidth data corresponding to the currently connected source device 10 is stored in the memory 120. In another embodiment, the processor 130 also searches whether the source equalizer characteristic data FFE RATE for the source equalizer EQ_T included in the currently connected source device 10 is stored in the memory 120.

If the transmission characteristic data corresponding to the currently connected source device 10 is stored in the memory 120 (S410, YES), operation S421 is performed. In operation S421, the sink device 100 determines to perform FRL link training with the value of the stored transmission characteristic data. In an embodiment, when FRL transmission bandwidth data corresponding to the currently connected source device 10 is stored in the memory 120, the processor 130 determines to start FRL link training with a bandwidth value of the FRL transmission bandwidth data. In another embodiment, when the source equalizer characteristic data PPE RATE is stored in the memory 120, the processor 130 determines to start FRL link training with the characteristic value of the source equalizer characteristic data FFE RATE corresponding to the currently connected source device 10 together with the bandwidth value described above.

If the transmission characteristic data corresponding to the currently connected source device 10 is not stored in the memory 120 (S410, NO), operation S422 is performed. In operation S422, the sink device 100 determines to perform FRL link training with a value of transmission characteristic data that the sink device 100 may support. In an embodiment, the processor 130 determines to start FRL link training with a bandwidth value of supportable maximum FRL transmission bandwidth data (e.g., a bandwidth value included in the EDID among 48 Gbps, 40 Gbps, 32 Gbps, 24 Gbps, 18 Gbps, and 9 Gbps).

Operation S430 is an FRL link training operation. In operation S430, the sink device 100 performs FRL link training on the currently connected source device 10. In an embodiment, the processor 130 performs FRL link training with the bandwidth value of the FRL transmission bandwidth data determined in operation S421. Alternatively, the processor 130 sequentially performs FRL link training from the bandwidth value of the FRL transmission bandwidth data (e.g., the maximum FRL transmission bandwidth data supportable by the sink device 100) to a minimum bandwidth value (e.g., 9 Gbps based on HDMI 2.1) according to a transmission interface standard (e.g., the HDMI transmission standard). In an embodiment, when performing FRL link training, the processor 130 transmits the maximum supportable FRL transmission bandwidth data or the FRL transmission bandwidth data stored in the memory 120 to the source device 10 through the signal input/output module 150, and the source device 10 provides a pattern signal to the sink device 100 as a bandwidth value of the received FRL transmission bandwidth data, and determines whether FRL link training is passed based on a response signal received from the sink device 100. In another embodiment, if the source equalizer characteristic data FFE RATE is stored in the memory 120, the processor 130 additionally transmits even the source equalizer characteristic data FFE RATE corresponding to the currently connected source device to the source device 10, when performing FRL link training.

If FRL link training is passed (S440, YES), operation S450 is performed. In operation S450, the sink device 100 stores pass transmission bandwidth data. The pass transmission bandwidth data may be data when FRL link training is passed, may include pass FRL transmission data indicating a bandwidth value using which FRL link training is passed, and may further include first pass equalizer characteristic data indicating a characteristic value using which FRL link training is passed. Here, when operation S421 is performed, the pass transmission bandwidth data may be the same as the data stored in the memory 120. Therefore, operation S450 may be omitted and operation S460 may be performed to reduce power consumption. When operation S422 is performed, the processor 130 controls the memory 120 to store pass FRL transmission bandwidth data indicating a passed bandwidth value among bandwidth values from a maximum bandwidth value to a minimum bandwidth value.

Operation S460 is a setting operation. In operation S460, the sink device 100 sets a characteristic value of the sink equalizer EQ_R. In an embodiment, the processor 130 sets a characteristic value of the CTLE.

Operation S470 is a reproducing operation processing operation. In operation S470, the sink device 100 performs a reproducing operation based on a content signal transmitted from the source device 10 in a state in which the content signal is stably transmitted. In an embodiment, the processor 130 processes a content signal transmitted with a transmission bandwidth using which FRL link training has been passed or a content signal transmitted using the TMDS transmission method, and the playback device performs a reproducing operation based on the processed content signal.

If the FRL link training fails (S440, NO), the sink device 100 determines whether the source equalizer EQ_T operates. In an embodiment, the processor 100 determines whether the equalizer EQ_T operates by determining whether the characteristic value of FFE has been used in the FRL link training.

During FRL link training, if the source equalizer EQ_T operates (S480, YES), operation S491 is performed. In operation S491, the sink device 100 requests the source device 10 to stop the operation of the source equalizer EQ_T. In an embodiment, the processor 130 transmits data indicating that the operation of the source equalizer EQ_T should be turned off to the source device 10. Here, transmission of the data indicating that the operation of the source equalizer EQ_T should be turned off to the source device 10 may refer to transmission of response data not including a characteristic value of the source equalizer EQ_T, e.g., the characteristic value of FFE to the source device 10. Referring to FIGS. 2 and 3, for example, the processor 130 transmits, through the signal input/output module 150, response data including information that the characteristic value of FFE is NULL to the source device 10. After operation S491 is performed, operation S430 is performed again. Here, FRL link training is performed again only with the bandwidth value of the FRL transmission bandwidth data.

When the operation of the source equalizer EQ_T is stopped during FRL link training (S480, NO), operation S492 is performed. In operation S492, the sink device 100 stores data indicating that the signal transmission method of the source device 10 is the TMDS transmission method. In an embodiment, the processor 130 controls the memory 120 to store information indicating that the currently connected source device 10 transmits the content signal to the sink device 100 according to the TMDS transmission method. Referring to FIG. 3, for example, for a source device having a source ID "E", the memory 120 may store FRL transmission bandwidth data and source equalizer characteristic data FFE RATE, each being NULL. After operation S492 is performed, operation S460 is performed.

As described above, by storing data improved or optimized for transmission standards for each source device that has been previously connected, a time required for FRL link training may be reduced and video and audio may be reproduced faster when the same source device is connected later.

Figure 5A:
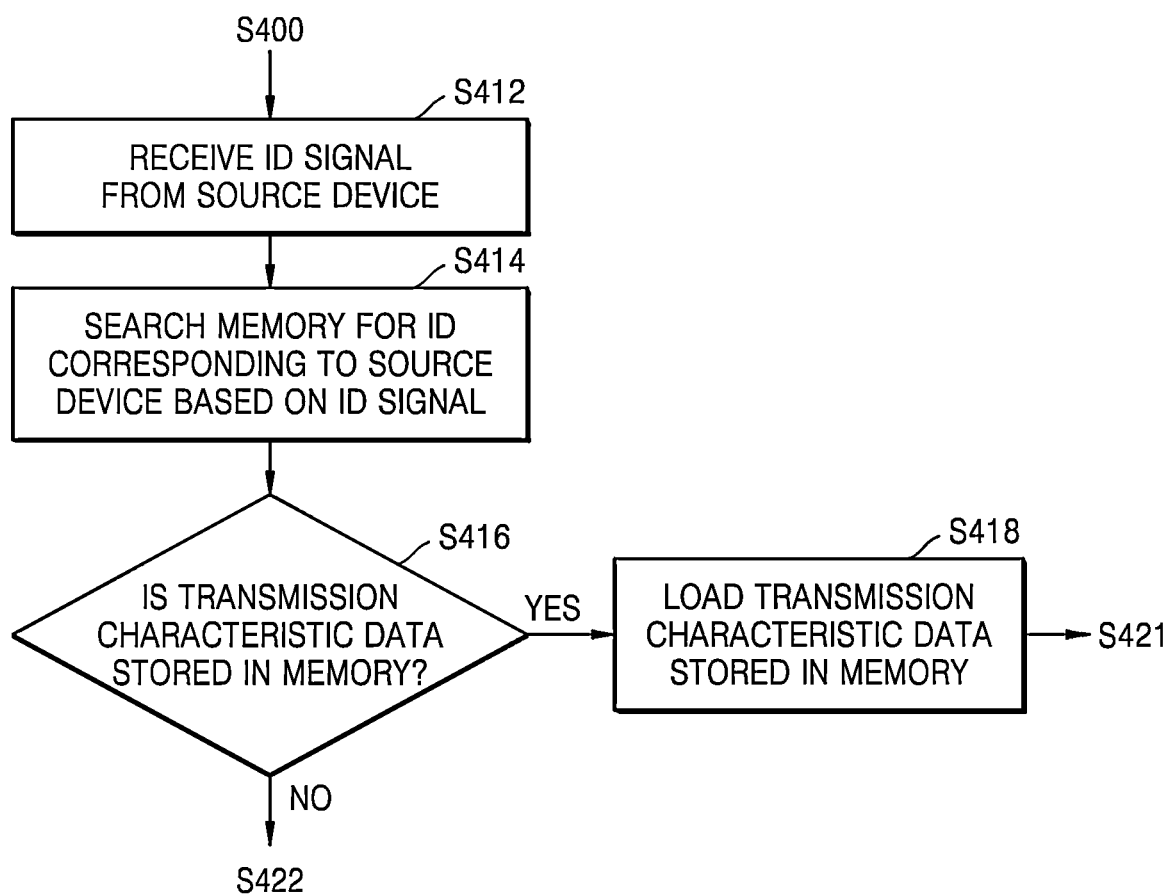
FIGS. 5A and 5B are flowcharts illustrating a search operation according to embodiments of the inventive concepts.
Figure 5B:
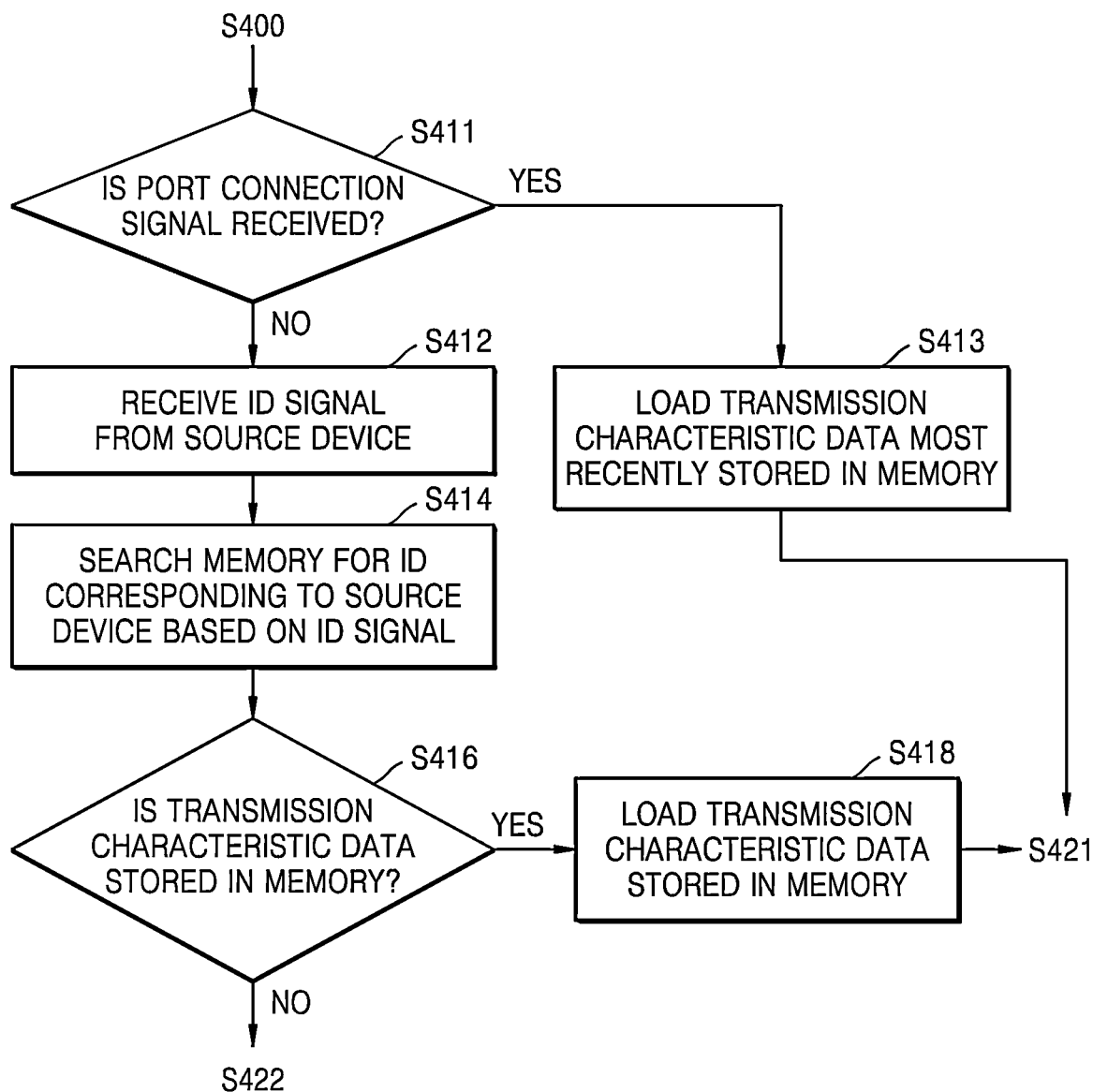

FIGS. 5A and 5B are flowcharts illustrating a search operation according to embodiments of the inventive concepts.

Referring to FIG. 5A, after operation S400, in operation S412, the sink device 100 receives an ID signal from the source device 10. Referring to FIG. 2, for example, the receiver 210 receives an ID signal for identifying the source device 20 through status and control data channel (SCDC) communication. The ID of the source device 10 indicated by the ID signal may be, for example, any one of A to E or a symbol other than A to E with reference to FIG. 3.

In operation S414, the sink device 100 searches the memory 120 for an ID corresponding to the source device 10 based on the ID signal. In an embodiment, when the memory 120 stores FRL transmission bandwidth data for the source devices (e.g., A to E shown in FIG. 3), the processor 130 searches the memory 120 for FRL transmission bandwidth data of the source device 10, among the source devices, based on the ID signal.

In operation S416, the processor 130 determines whether transmission characteristic data corresponding to the currently connected source device 10 is stored in the memory 120.

If the transmission characteristic data corresponding to the currently connected source device 10 is stored (S416, YES), operation S418 is performed. In operation S418, the processor 130 loads the corresponding transmission characteristic data stored in the memory 120. Operation S421 is performed after operation S418.

As described above, by efficiently searching whether the source device 10 has previously been connected to the sink device 100, the time required for FRL link training may be reduced.

If the transmission characteristic data corresponding to the currently connected source device 10 is not stored (S416, NO), operation S422 is performed.

An event such as power off may occur while the HDMI port of the source device 10 is connected to the HDMI port of the sink device 100. In this case, it is necessary to provide video and audio to a user more quickly by minimizing a process in which FRL link training is performed.

Referring to FIG. 5B, in operation S411 after operation S400, the sink device 100 determines whether a port connection signal is received. The port connection signal may be a signal indicating that a connection state between the source device 10 and the sink device 100 is maintained. Referring to FIGS. 1 and 2, for example, when the HDMI port of the source device 10 is physically connected to the HDMI port of the sink device 100, the sink device 100 may know whether a port connection signal is received upon receiving a physical signal using a pin provided in the physically connected HDMI port.

When the port connection signal is received (S411, YES), operation S413 is performed. In operation S413, the processor 130 loads the most recently stored transmission characteristic data from the memory 120 in response to the port connection signal. This is because, the HDMI port of the source device 10 is not connected to the HDMI port of the sink device 100, so the sink device 100 has recently stored transmission characteristic data for the source device 10, which is currently connected. Operation S421 is performed after operation S413. In an embodiment, the processor 130 transmits the FRL transmission bandwidth data most recently stored in the memory 120 to the source device 10 through the signal input/output module 150 in response to the port connection signal. That is, the processor 130 performs FRL link training with a bandwidth value of the FRL transmission bandwidth data most recently stored in the memory 120.

If the port connection signal is not received (S411, NO), that is, when the HDMI port of the source device 10 and the HDMI port of the sink device 100 are physically separated and then connected again to each other, operation S412 is performed. Referring to FIGS. 1 and 2, for example, the signal input/output module 150, before the FRL link training starts, receives an ID signal, and the processor 130 transmits the FRL transmission bandwidth data corresponding to the ID signal or the maximum FRL transmission bandwidth data supportable by the sink device 100 to the source device 10 through the signal input/output module 150.

As described above, by reducing the time required for FRL link training, images and audio may be reproduced more quickly and user convenience may be promoted.

Figure 6:
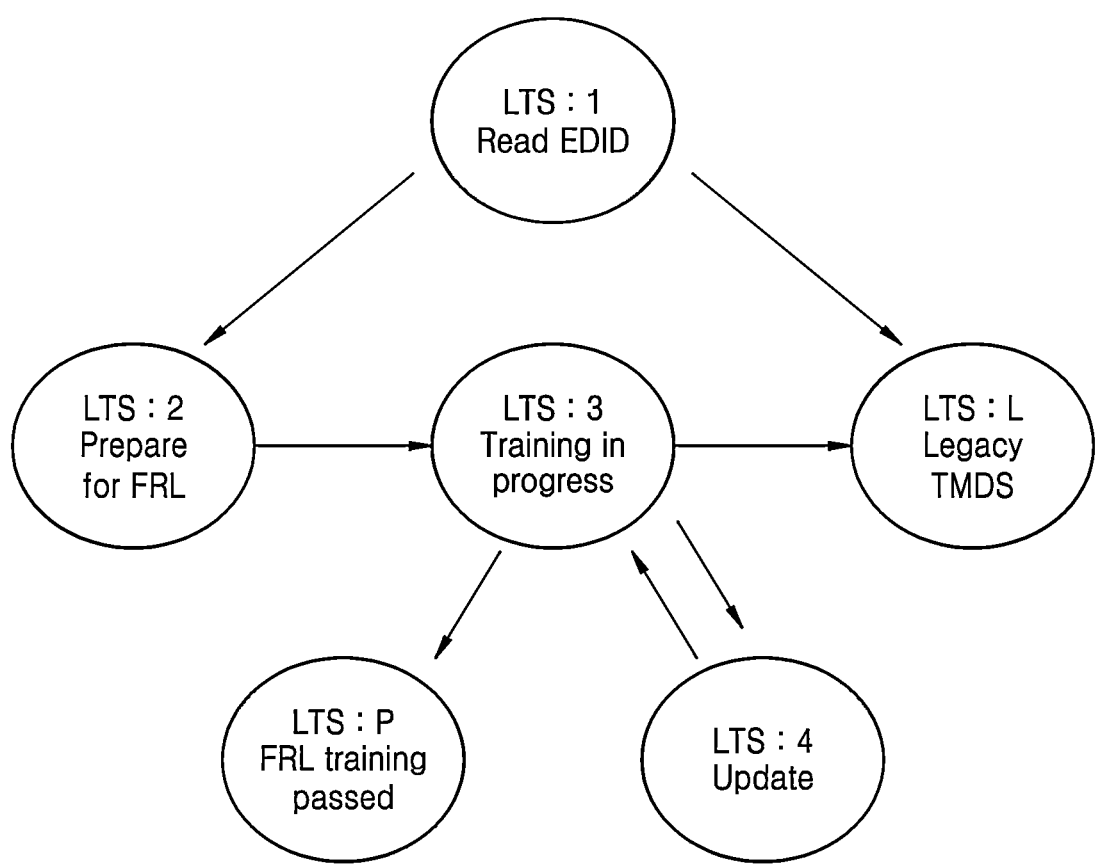
FIG. 6 is a diagram illustrating FRL link training according to an embodiment of the inventive concepts.

FIG. 6 is a diagram illustrating FRL link training according to an embodiment of the inventive concepts.

Referring to FIG. 6, FRL link training may have a link training state 1 (LTS: 1), link training state 2 (LTS: 2), link training state 3 (LTS: 3), and link training state 4 (LTS: 4), and may have a link training state L (LTS: L) or a link training state P (LTS: P) according to a result of FRL link training.

In the link training state 1 (LTS: 1), when an HPD signal is changed from a low state to a high state, the source device 10 reads the EDID of the sink device 100. The EDID of the sink device 100 includes information on whether the FRL transmission method is supported. When the sink device 100 supports the FRL transmission method, the link training state 2 (LTS: 2) is entered. When the sink device 100 does not support the FRL transmission method, the link training state L (LTS: L) is entered.

In link training state 2 (LTS: 2), the source device 10 prepares to transmit a pattern signal according to the FRL transmission method.

In link training state 3 (LTS: 3), the source device 10 and the sink device 100 perform FRL link training. The source device 10 transmits the pattern signal to the sink device 100 with a transmission bandwidth of the maximum FRL transmission bandwidth data, and the sink device 100 transmits a response signal (or response data) with respect to the pattern signal to the source device 10. The response signal may include information indicating a pass or an error. If the response signal indicates the pass, the FRL link training has passed and the link training state P(LTS: P) is entered. If the response signal indicates an error, link training state 4 (LTS: 4) is entered. Also, the source device 10 may set a characteristic value of the FFE. When the sink device 100 stores the transmission characteristic data for the source device 10, the sink device 100 transmits the transmission characteristic data to the source device 10 during FRL link training, and the source device 10 transmits the pattern signal with a value of the transmission characteristic data to the sink device 100.

In link training state 4 (LTS: 4), when the sink device 100 transmits a response signal including information indicating an error to the source device 10, the source device 10 lowers the transmission characteristic, and the link training state 3 (LTS: 3) is entered. Here, lowering the transmission characteristics may mean that the transmission bandwidth is lowered from 48 Gbps to 40 Gbps, from 40 Gbps to 32 Gbps, from 32 Gbps to 24 Gbps, from 24 Gbps to 18 Gbps, or from 18 Gbps to 9 Gbps step by step. In an embodiment, when the source device 10 transmits a pattern signal at 48 Gbps and the sink device 100 transmits a response signal including information indicating an error, the source device 10 performs FRL link training again by transmitting the pattern signal again at 40 Gbps, one step lower than 48 Gbps. When the source device 10 sets the characteristic value of FFE, the source device 10 transmits the pattern signal to the sink device 100 by sequentially changing the characteristic value of FFE with respect to a certain transmission bandwidth step by step. In an embodiment, with respect to the pattern signal transmitted at 48 Gbps and with FFE 0, when a response signal includes information indicating an error, the source device 10 transmits the pattern signal to the sink device 100 by changing the transmission characteristic from 48 Gbps and FFE 0 to 48 Gbps and FFE 1. As such, whenever an error occurs, the transmission characteristics are changed from 48 Gbps and FFE 0 to 48 Gbps and FFE 3 step by step, and when an error occurs in the pattern signal transmitted at 48 Gbps and with FFE 3, the operation described above is performed again by changing the transmission bandwidth (e.g., changed from 48 Gbps and FFE 3 to 40 Gbps and FFE 0).

If an error occurs for the lowest transmission characteristic of 9 Gbps (or 9 Gbps and FFE 3) or a preset time has elapsed (i.e., timeout), the FRL link training fails, and the link training state L(LTS: L) is entered. In the link training state L(LTS: L), after the FRL link training is completed, the source device 10 transmits a content signal to the sink device 100 according to the TMDS transmission method.

Figure 7:
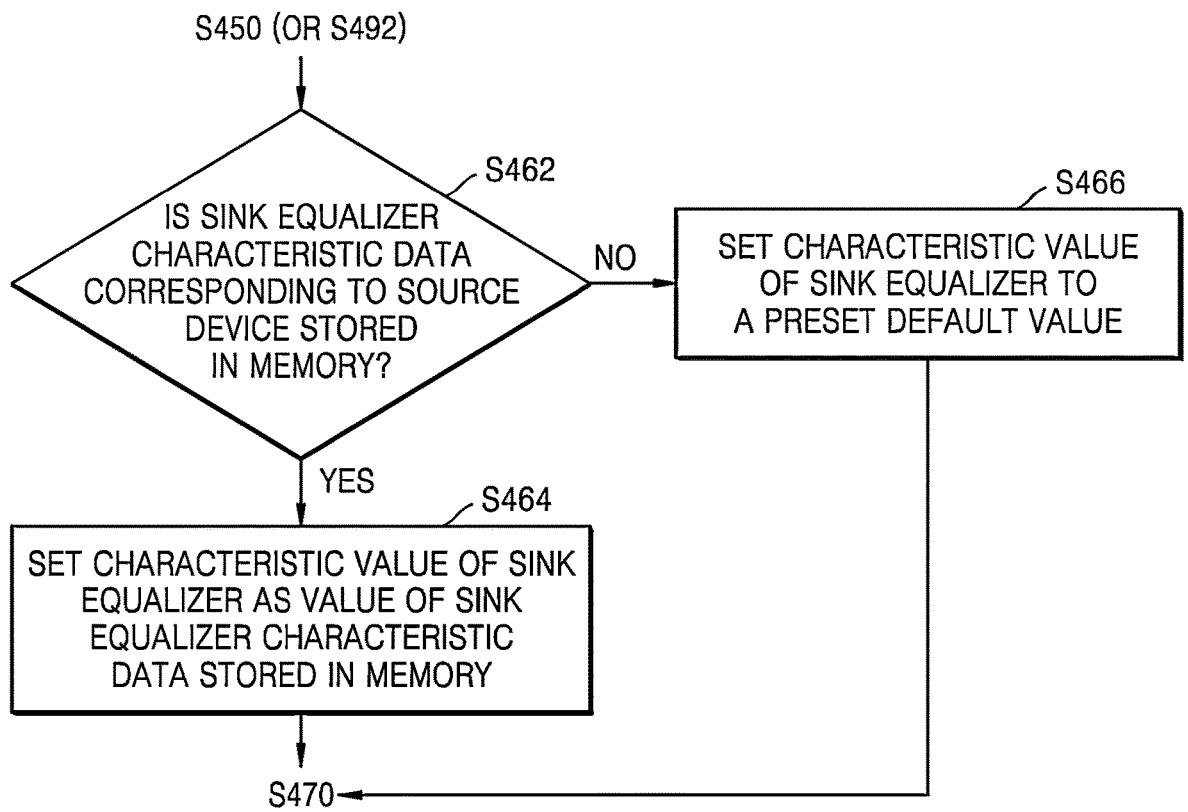
FIG. 7 is a flowchart illustrating a setting operation according to an embodiment of the inventive concepts.

FIG. 7 is a flowchart illustrating a setting operation according to an embodiment of the inventive concepts.

Referring to FIG. 7, operation S462 is performed after operation S450 (or operation S492). In operation S462, the processor 130 searches the memory 120 for the sink equalizer characteristic data CTLE PHY corresponding to the source device 10. The sink equalizer characteristic data CTLE PHY is data representing a characteristic value of the sink equalizer EQ_R.

When the sink equalizer characteristic data CTLE PHY is stored in the memory 120 (S462, YES), operation S464 is performed. In operation S464, the processor 130 sets the characteristic value of the sink equalizer EQ_R as a characteristic value of the sink equalizer characteristic data CTLE PHY stored in the memory 120. Operation S470 is performed after operation S464.

If the sink equalizer characteristic data CTLE PHY is not stored in the memory 120, that is, when the search for the sink equalizer characteristic data CTLE PHY corresponding to the source device 10 fails (S462, NO), operation S466 is performed. In operation S466, the processor 130 sets the characteristic value of the sink equalizer EQ_R to a preset default value. Operation S470 is performed after operation S466.

Figure 8:
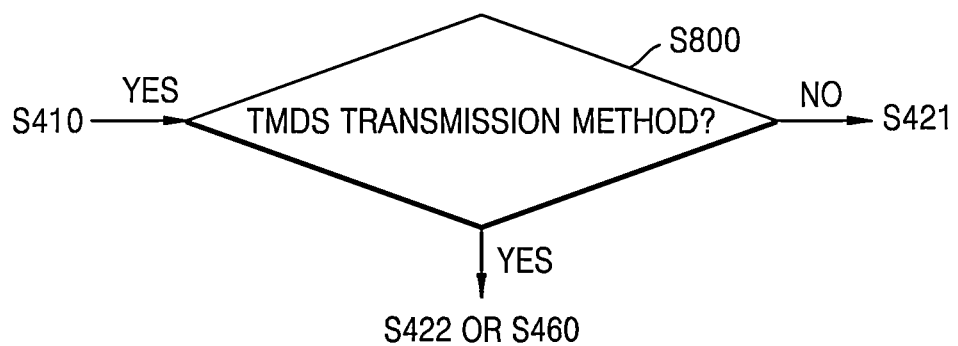
FIG. 8 is a flowchart illustrating a modification of the embodiment shown in FIG. 4.

FIG. 8 is a flowchart illustrating a modification of the embodiment shown in FIG. 4.

Referring to FIGS. 3 and 8, when FRL link training between the source device 10 and the sink device 100 fails or when the source device 10 has an ID "E" as a source ID, a content signal may be transmitted according to the TMDS transmission method each time the source device 10 is connected to the sink device 100 to quickly perform a reproducing operation. Alternatively, in order to provide a high-resolution image to the user, the FRL link training may be attempted again without using the data stored in the memory 120.

After operation S410, operation S800 is performed. In operation S800, the sink device 100 determines whether a transmission method for the currently connected source device 10 to output a signal is the TMDS transmission method.

If the transmission method of the currently connected source device 10 is the TMDS transmission method (S800, YES), operation S422 is performed or operation S460 is performed.

If the transmission method of the currently connected source device 10 is not the TMDS transmission method (S800, NO), operation S421 is performed.

Figure 9:
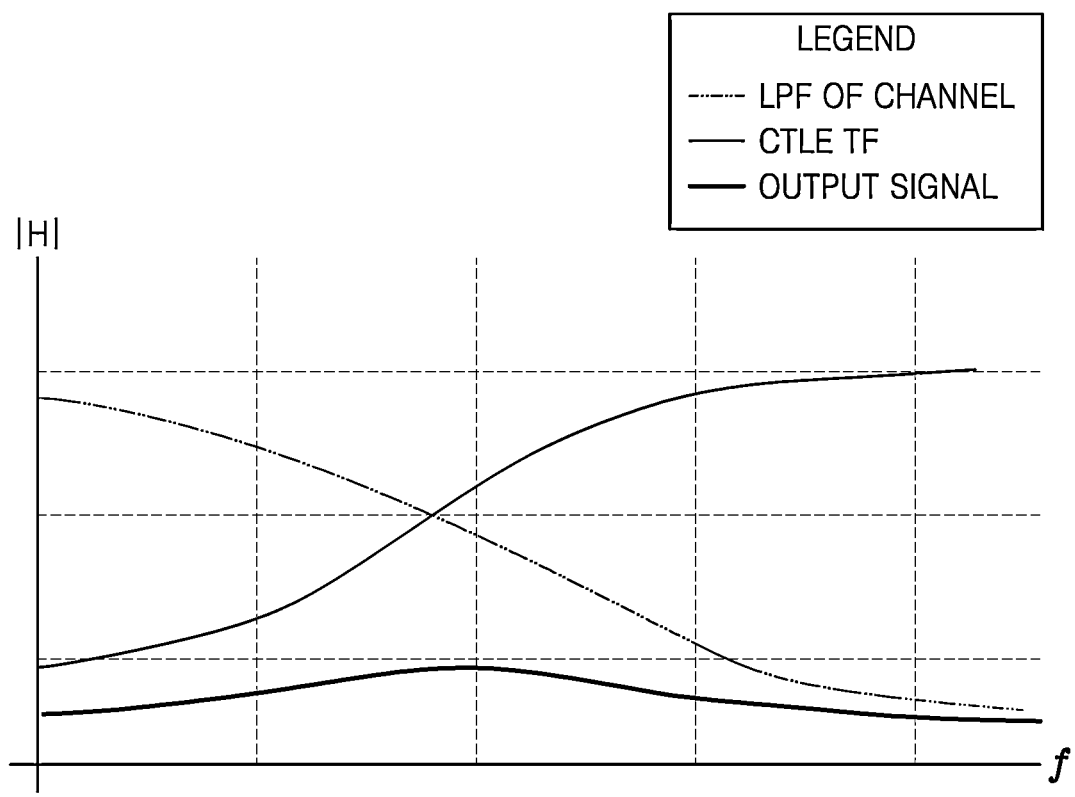
FIG. 9 is a diagram illustrating a sink equalizer according to an embodiment of the inventive concepts.

FIG. 9 is a diagram illustrating a sink equalizer according to an embodiment of the inventive concepts.

Referring to FIG. 9, in the graph shown in FIG. 9, the horizontal axis represents the frequency f and the vertical axis represents the magnitude of a signal or the characteristic (|H|) of a transfer function. A signal transmitted from the source device 10 may be distorted due to characteristics of a channel (or lane) formed between the source device 10 and the sink device 100. Such a characteristic of the channel may be, for example, a characteristic (LPF OF CHANNEL) of a low pass filter.

Equalizing performed by the sink equalizer EQ_R may be an operation that restores a distorted waveform of a signal to an intended waveform (or a waveform close to the intended waveform) and may be an operation that gives the signal an effect opposite to the characteristics of the channel. For example, the characteristic of the sink equalizer EQ_R, which is a CTLE, may be a frequency response characteristic of a high pass filter. The sink equalizer EQ_R may equalize a signal transmitted from the source device 10 and output an output signal OUTPUT SIGNAL.

As described above, because the sink equalizer EQ_R restores the distorted signal, interference may be reduced and signal quality and communication quality may be improved.

The degree to which the signal transmitted from the source device 10 is distorted varies depending on the source device 10, a length of a channel, a reproduction time, and the like, and thus, the characteristic value of the sink equalizer EQ_R may need to be changed.

Figure 10:
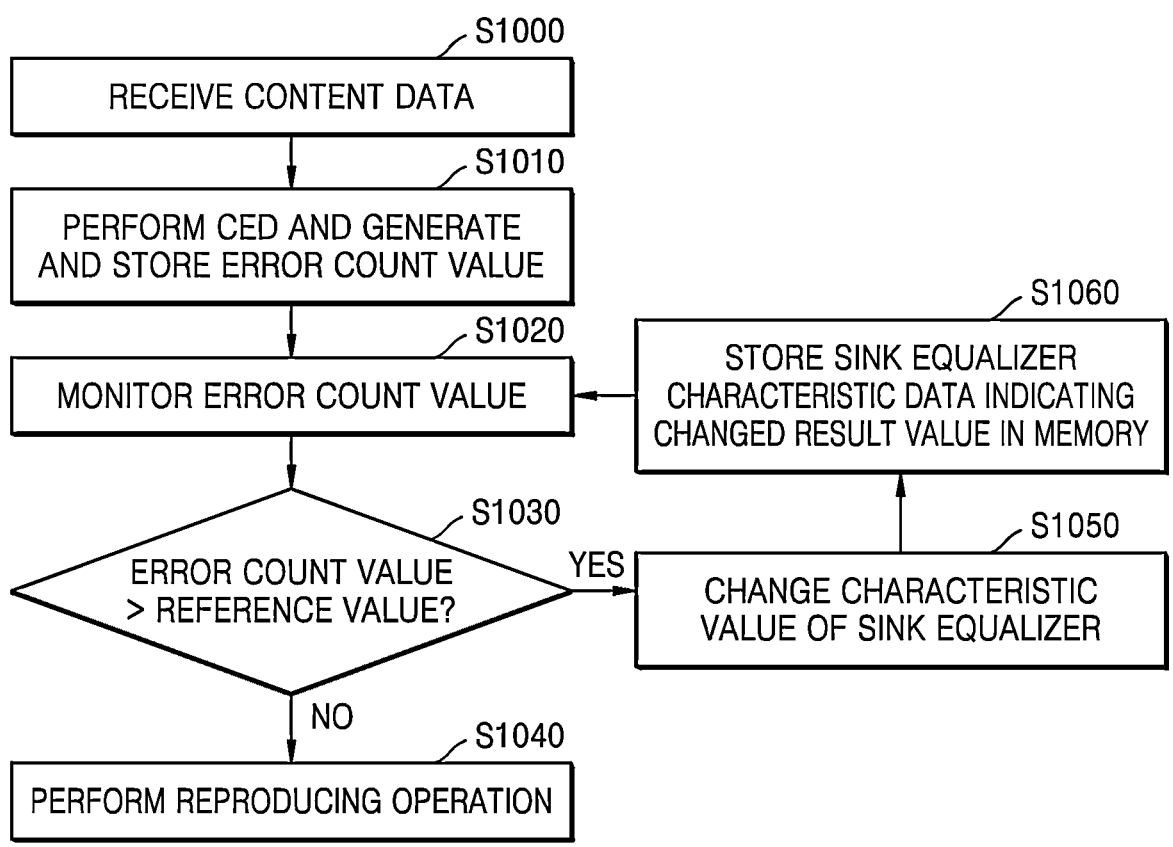
FIG. 10 is a flowchart illustrating another operating method of a sink device according to an embodiment of the inventive concepts.

FIG. 10 is a flowchart illustrating another operating method of the sink device 100 according to an embodiment of the inventive concepts.

Referring to FIG. 10, in operation S1000, the sink device 100 receives a content signal from the currently connected source device 10.

In operation S1010, the sink device 100 generates an error count value by performing character error detection (CED) on the received content signal and stores the generated error count value. In an embodiment, the processor 130 performs CED on the content signal to generate an error count value and controls the memory 120 to store the generated error count value.

In operation S1020, the sink device 100 monitors the error count value. In an embodiment, the processor 130 monitors the error count value stored in the memory 120 whenever a preset monitoring period arrives.

In operation S1030, the sink device 100 monitors whether the error count value is greater than a reference value. In an embodiment, the processor 130 changes the characteristic value of the sink equalizer EQ_R according to whether the error count value is greater than the reference value. The reference value may be previously stored in the memory 120.

If the error count value is less than or equal to the reference value (S1030, NO), operation S1040 is performed. In operation S1040, the sink device 100 performs a reproducing operation.

If the error count value is greater than the reference value (S1030, YES), operation S1050 is performed. In operation S1050, the sink device 100 changes the characteristic value of the sink equalizer EQ_R. In an embodiment, the processor 130 changes the characteristic value of the sink equalizer EQ_R until the error count value is less than or equal to the reference value.

In operation S1060, the processor 130 stores the changed sink equalizer characteristic data in the memory 120. In an embodiment, the processor 130 controls the memory 120 to store sink equalizer characteristic data indicating the changed characteristic value. Operation S1020 is performed after operation S1060. While operation S1040 is performed, operations S1050 and S1060 may be performed at the same time in an overlapping manner or may be performed as a background operation.

As described above, by actively adjusting the characteristic value of the equalizer included in the sink device according to the error count value generated according to the result of performing CED, dot noise, screen blinking, no signal, etc. may be prevented or reduced.

In addition, as described above, a high-resolution image may be provided without replacing an HDMI cable even in an environment in which an error may occur during the reproducing operation.

Hereinafter, embodiments of changing the characteristic value of the sink equalizer EQ_R are described, and here, for convenience, it is assumed that the sink equalizer EQ_R is a CTLE.

FIGS. 11A and 11B are diagrams illustrating an embodiment of changing a characteristic value of a sink equalizer.

Referring to FIGS. 2 and 11A, as described above, the characteristic of the CTLE may include boost, gain, attenuation, and the like. Here, it is assumed that the attenuation value and the gain value are constant as "a" and "g", respectively.

In a first monitoring period, the boost value may be set to "b1". Here, a monitored error count value may be "e1". It is assumed that "e1" is greater than a reference value th. In this case, the processor 130 may change the boost value in a first change direction. The first change direction may be, for example, an increasing direction. However, the inventive concepts are not limited thereto, and the first change direction may be a decreasing direction. Referring to FIGS. 1 and 11A, for example, the processor 130 may change the boost value from "b1" to "b2". Here, it is assumed that "b2" is greater than "b1". However, the inventive concepts are not limited thereto.

In a second monitoring period, a monitored error count value may be "e2". It is assumed that "e2" is greater than "e1". Because the error count value has increased more than before, the processor 130 may change the boost value in the second change direction. The second change direction may be opposite to the first change direction. Referring to FIGS. 1 and 11A, for example, the processor 130 may change the boost value from "b2" to "b3". Here, it is assumed that "b3" is smaller than "b2".

In a third monitoring period, an error count value may be "e3". It is assumed that "e3" is less than or equal to "e2" and greater than the reference value th. In this case, because the error count value is decreased, the processor 130 may change the boost value in a direction (e.g., the second change direction) in which the characteristic value of the CTLE is changed in the second monitoring period. Referring to FIGS. 1 and 11A, for example, the processor 130 may change the boost value from "b3" to "b4". Here, it is assumed that "b4" is smaller than "b3".

Similarly, in fourth and fifth monitoring periods, assuming that the error count value is gradually decreased, the processor 130 may change the boost value in a direction (e.g., the second change direction) in which the characteristic value of the CTLE is changed in the second monitoring period.

In a sixth monitoring period, an error count value may be "e6". It is assumed that "e6" is greater than "e5". Because the error count value has increased more than before, the processor 130 may change the characteristic value of the CTLE in a direction (e.g., the second change direction) in which the characteristic value of the CTLE is changed in the fifth monitoring period. Referring to FIGS. 1 and 11A, for example, the processor 130 may change the boost value from "b6" to "b7". Here, it is assumed that "b7" is greater than "b6".

To sum up, if the error count value monitored in the current monitoring period decreases compared to the error count value monitored in the previous monitoring period, the processor 130 may change the boost value in the same direction in which the boost value was changed in the previous monitoring period. Conversely, if the error count value monitored in the current monitoring period increases compared to the error count value monitored in the previous monitoring period, the processor 130 may change the boost value in a direction opposite to the direction in which the boost value was changed in the previous monitoring period. This operation may be repeated until the error count value monitored in the current monitoring period is less than or equal to the reference value th.

In a fourteenth monitoring period, it is assumed that the error count value is "e14", and "e14" is less than or equal to the reference value th. The processor 130 may control the memory 120 to store "b14", which is a boost value changed during a thirteenth monitoring period.

Referring to FIG. 11B, it is assumed that the attenuation value and the boost value are constant as "a" and "b", respectively.

In the first monitoring period, a gain value may be set to "g1". Here, a monitored error count value may be "e1". It is assumed that "e1" is greater than the reference value th. The processor 130 may change the gain value from "g1" to "g2". Here, it is assumed that "g2" is greater than "g1". However, the inventive concepts are not limited thereto.

After the first monitoring period, as described above with reference to FIG. 11A, if the error count value monitored in the current monitoring period decreases compared to the error count value monitored in the previous monitoring period, the gain value may be changed in the same direction as the direction in which the gain value was changed in the previous monitoring period. Conversely, if the error count value increases more than before, the gain value may be changed in a direction opposite to the direction in which the gain value was changed in the previous monitoring period. This operation may be repeated until the error count value monitored in the current monitoring period is less than or equal to the reference value th.

In a ninth monitoring period, it is assumed that the error count value is "e9", and "e9" is a small value less than or equal to the reference value th. The processor 130 may control the memory 120 to store "g9", which is a gain value changed during an eighth monitoring period.

The embodiment described above may also be applied to attenuation. In the embodiment shown in each of FIGS. 11A and 11B, the processor 130 changes only one characteristic value among the characteristic values of the CTEL, but the inventive concepts are not limited thereto, and an embodiment in which two or more characteristic values are also changed may be apparently derived. A variation in which the characteristic value of CTLE is changed may be constant or may be previously set.

A comparison relation between the number of monitoring and the error count values shown in each of FIGS. 11A and 11B are an example, and the inventive concepts are not limited thereto.

Figure 12:
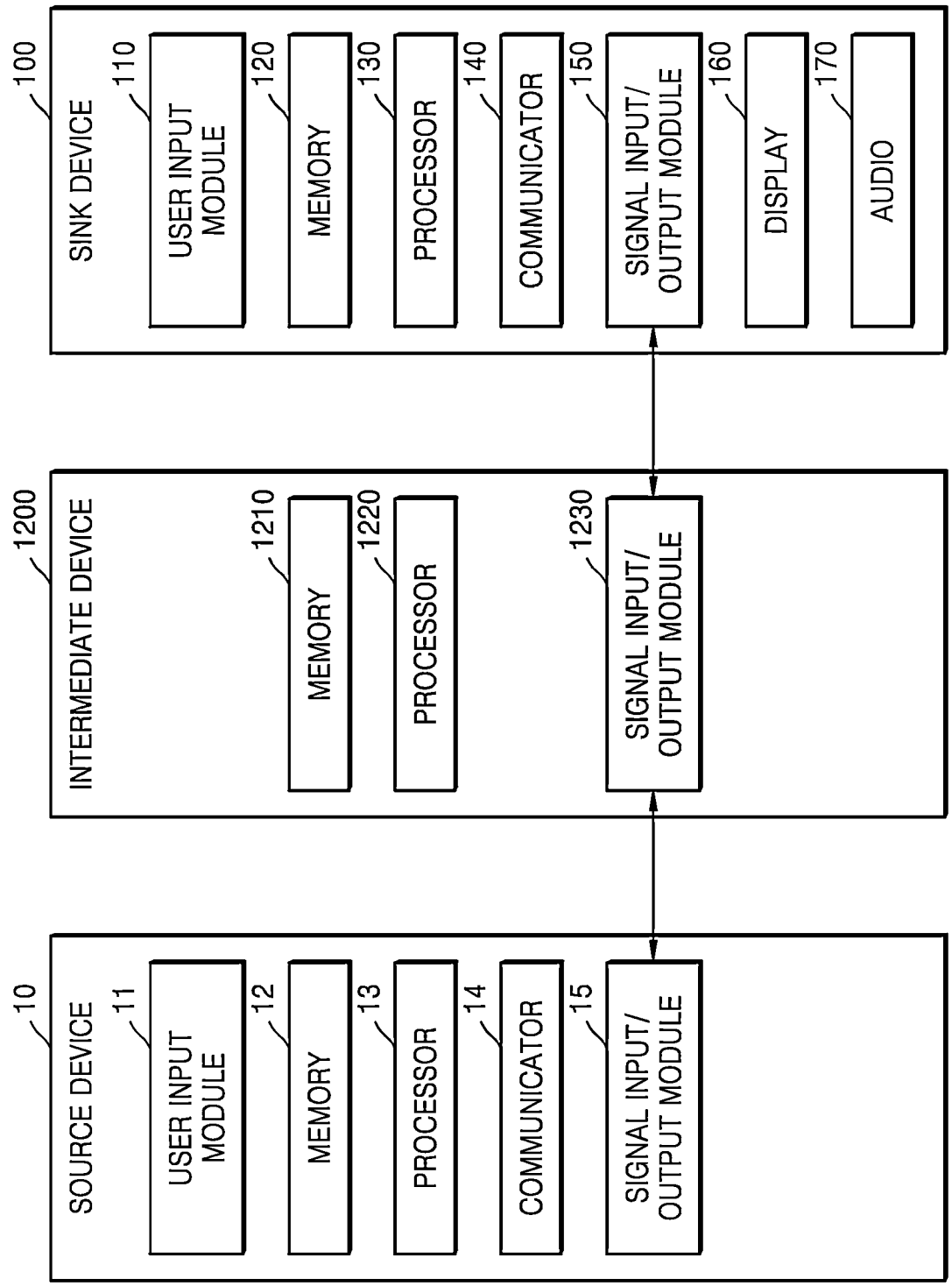
FIG. 12 is a diagram illustrating a source device, an intermediate device, and a sink device according to an embodiment of the inventive concepts.

FIG. 12 is a diagram illustrating the source device 10, an intermediate device 1200, and the sink device according to an embodiment of the inventive concepts.

Referring to FIG. 12, the source device 10 and the sink device 100 are similar to or the same as those described above. However, the signal input/output module 15 included in the source device 10 may communicate with a signal input/output module 1230 included in the intermediate device 1200. The signal input/output module 150 included in the sink device 100 may communicate with the signal input/output module 1230 included in the intermediate device 1200.

The source device 10 and the sink device 100 may be respectively connected to the intermediate device 1200 through a cable. Accordingly, signals generated by each of the source device 10 and the sink device 100 may be transmitted through the cable. For example, a content signal may be transmitted from the source device 10 to the intermediate device 1200 and from the intermediate device 1200 to the sink device 100 via the cable. As another example, the EDID may be transmitted from the sink device 100 to the source device 10 through the intermediate device 1200.

The intermediate device 1200 may relay between the source device 10 and the sink device 100. For example, the intermediate device 1200 may transmit a content signal output from the source device 10 to the sink device 100. Alternatively, the intermediate device 1200 may transmit various control signals, response data (or response signals), EDID, etc. output from the sink device 100 to the source device 10. However, the inventive concepts are not limited thereto.

The intermediate device 1200 may be implemented in various forms, such as a repeater, an AV receiver, a repeater, a home theater, a converter, and a relay device. The intermediate device 1200 may support an interface standard for signal transmission so that an image signal provided by the source device 10 may be processed by the sink device 100.

The intermediate device 1200 may include a memory 1210, a processor 1220, and the signal input/output module 1230.

Additionally, the source device 10 and the sink device 100 and/or the components included therein may include and/or be included in processing circuitry such as hardware including logic circuits; a hardware/software combination such as a processor executing software; or a combination thereof. For example, the processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

While the inventive concepts have been particularly shown and described with reference to embodiments thereof, it will be understood that various changes in form and details may be made therein without departing from the spirit and scope of the following claims.

What is claimed is:

1. An electronic device comprising:
a receiver configured to receive a signal transmitted from a source device;
a memory configured to store first data;
a processor configured to search the memory for fixed rate link (FRL) transmission bandwidth data corresponding to the source device in response to an electrical connection to the source device, perform FRL link training with a bandwidth value of the FRL transmission bandwidth data determined according to a FRL transmission bandwidth data search result, and process a content signal transmitted with a transmission bandwidth when the FRL link training is completed; and
a reproducing device configured to perform a reproducing operation based on the content signal processed by the processor,
wherein the processor is configured to search the memory for source equalizer characteristic data for a source equalizer included in the source device, and perform the FRL link training with a characteristic value of the source equalizer characteristic data determined according to a source equalizer characteristic data search result and the bandwidth value.

2. The electronic device of claim 1, wherein the processor is configured to perform the FRL link training sequentially from a maximum bandwidth value of maximum FRL transmission bandwidth data supportable by the electronic device to a minimum bandwidth value according to an interface standard, when the source device is first connected to the electronic device.

3. The electronic device of claim 2, wherein the processor is configured to control the memory to store pass FRL transmission bandwidth data indicating a passed bandwidth value using which the FRL link training is passed, among bandwidth values from the maximum bandwidth value to the minimum bandwidth value.

4. The electronic device of claim 1, wherein the processor is configured to perform the FRL link training again with only the bandwidth value, when the FRL link training fails.

5. The electronic device of claim 1, wherein the receiver includes a sink equalizer configured to equalize the signal transmitted from the source device based on a characteristic value of sink equalizer characteristic data, and
the processor is configured to search the memory for the sink equalizer characteristic data corresponding to the source device and set the characteristic value based on a sink equalizer characteristic data search result.

6. The electronic device of claim 5, wherein the processor is configured to set the characteristic value to a preset default value, when search for the sink equalizer characteristic data corresponding to the source device fails.

7. The electronic device of claim 5, wherein the processor is configured to perform a character error detection (CED) on the content signal to generate an error count value,
monitor the error count value each time a preset monitoring period arrives, change the characteristic value according to a monitoring result, and
control the memory to store sink equalizer data indicating a changed characteristic value.

8. The electronic device of claim 7, wherein the processor is configured to monitor whether the error count value is greater than a reference value, and
change the characteristic value until the error count value is equal to or less than the reference value.

9. The electronic device of claim 8, wherein the processor is configured to change the characteristic value in a first change direction indicating a direction in which a value is adjusted, when a first error count value monitored in a first monitoring period is greater than the reference value, and change the changed characteristic value in a second change direction opposite to the first change direction, when a second error count value monitored in a second monitoring period that arrives after the first monitoring period is greater than the first error count value.

10. The electronic device of claim 8, wherein the processor is configured to change a changed result value in a first change direction, when a second error count value monitored in a second monitoring period is less than a first error count value and greater than the reference value.

11. An electronic device comprising:
a signal input/output module configured to communicate with a source device;
a memory configured to store first data;
a processor configured to search the memory for fixed rate link (FRL) transmission bandwidth data corresponding to the source device in response to an electrical connection to the source device, transmit FRL transmission bandwidth data determined according to a FRL transmission bandwidth data search result to the source device through the signal input/output module when FRL link training starts, and process a content signal received through the signal input/output module; and
a reproducing device configured to perform a reproducing operation based on the content signal processed by the processor,
wherein the processor is configured to search the memory for source equalizer characteristic data for a source equalizer included in the source device, and additionally transmit the source equalizer characteristic data determined according to a source equalizer characteristic data search result to the source device through the signal input/output module, when the FRL link training starts.

12. The electronic device of claim 11, wherein the processor is configured to transmit the FRL transmission bandwidth data to the source device through the signal input/output module, when the FRL transmission bandwidth data for the source device is stored in the memory.

13. The electronic device of claim 11, wherein the processor is configured to transmit maximum FRL bandwidth data supportable by the electronic device to the source device through the signal input/output module, when the source device is first connected to the electronic device.

14. The electronic device of claim 13, wherein the processor is configured to control the memory to store pass FRL transmission bandwidth data indicating a passed bandwidth value using which the FRL link training is passed.

15. The electronic device of claim 11, wherein the processor is configured to transmit data indicating that an operation of the source equalizer be turned off and the FRL transmission bandwidth data determined according to the FRL transmission bandwidth data search result to the source device through the signal input/output module, when the FRL link training fails.

16. The electronic device of claim 15, wherein the processor is configured to control the memory to store data indicating that a signal transmission method of the source device is a transition minimized differential signaling (TMDS) transmission method, when reperformed FRL link training fails.

17. The electronic device of claim 11, wherein the signal input/output module is configured to receive an ID signal for identifying the source device before the FRL link training starts,
the memory is configured to store FRL transmission bandwidth data for a plurality of source devices, and
the processor is configured to transmit FRL transmission bandwidth data corresponding to the ID signal or maximum FRL transmission bandwidth data supportable by the electronic device to the source device, among the plurality of source devices, through the signal input/output module.

18. An operating method of an electronic device, the operating method comprising:
toggling a hot plug detect signal;
searching a memory for fixed rate link (FRL) transmission bandwidth data corresponding to a source device, the searching including searching the memory for sink equalizer characteristic data corresponding to the source device;
transmitting transmission characteristic data determined according to a FRL transmission bandwidth data search result to the source device, when FRL link training starts;
setting a characteristic value of a sink equalizer equalizing a signal received from the source device based on a sink equalizer characteristic data search result, after the FRL link training is completed; and
performing a reproducing operation based on a content signal transmitted from the source device.

* * * * *